United States Patent
Kubota et al.

(10) Patent No.: US 11,577,670 B2
(45) Date of Patent: Feb. 14, 2023

(54) WEATHER STRIP, WEATHER STRIP ATTACHMENT STRUCTURE, AND WEATHER STRIP ATTACHMENT METHOD

(71) Applicants: NISHIKAWA RUBBER CO., LTD., Hiroshima (JP); HONDA MOTOR CO., LTD., Tokyo (JP)

(72) Inventors: Akiyoshi Kubota, Hiroshima (JP); Yasuyuki Kato, Saitama (JP); Yuuji Goto, Saitama (JP)

(73) Assignees: NISHIKAWA RUBBER CO., LTD., Hiroshima (JP); HONDA MOTOR CO., LTD., Tokyo (JP)

( * ) Notice: Subject to any disclaimer, the term of this patent is extended or adjusted under 35 U.S.C. 154(b) by 439 days.

(21) Appl. No.: 16/698,533

(22) Filed: Nov. 27, 2019

(65) Prior Publication Data
US 2020/0172024 A1 Jun. 4, 2020

(30) Foreign Application Priority Data
Nov. 29, 2018 (JP) .............................. JP2018-223953

(51) Int. Cl.
*B60R 13/06* (2006.01)
*B60J 10/30* (2016.01)
(Continued)

(52) U.S. Cl.
CPC .............. *B60R 13/06* (2013.01); *B60J 10/00* (2013.01); *B60J 10/30* (2016.02); *B62D 25/12* (2013.01); *B62D 65/06* (2013.01)

(58) Field of Classification Search
CPC ........ B60R 13/06; B62D 25/12; B62D 65/06; B60J 10/30; B60J 10/84
See application file for complete search history.

(56) References Cited

U.S. PATENT DOCUMENTS 5,219,382 A * 6/1993 Backes ..................... B60J 10/84
49/492.1
5,361,542 A * 11/1994 Dettloff .................. B60J 10/244
49/490.1

(Continued)

FOREIGN PATENT DOCUMENTS

| CN | 1629000 A | 6/2005 |
| CN | 202208243 U | 5/2012 |

(Continued)

OTHER PUBLICATIONS

Office Action for JP Patent Application No. 2018-223953, dated Oct. 6, 2020, 6 pages.

(Continued)

*Primary Examiner* — Phi D A
(74) *Attorney, Agent, or Firm* — Casimir Jones, SC; Robert A. Goetz (57) ABSTRACT

The present invention provides a weather strip which can be easily attached to a grille of an automobile without the need of a clip. The weather strip is a weather strip which seals a gap between a grille and a hood of an automobile and includes (i) an attachment wall to be attached to the grille, (ii) a sealing wall which comes in elastic contact with the hood, and (iii) an insertion section to be inserted into a through hole. The insertion section includes a rear locking portion and a front locking portion which are locked in the through hole.

8 Claims, 5 Drawing Sheets

(51) Int. Cl.
 *B62D 25/12* (2006.01)
 *B62D 65/06* (2006.01)
 *B60J 10/00* (2016.01)

(56) References Cited

U.S. PATENT DOCUMENTS

| | | | | |
|---|---|---|---|---|
| 2002/0112405 | A1* | 8/2002 | Nozaki | B60J 10/84 49/492.1 |
| 2004/0079032 | A1* | 4/2004 | Russell | B60J 10/248 49/498.1 |
| 2005/0064135 | A1* | 3/2005 | Perrin | B60J 10/84 428/122 |
| 2008/0265616 | A1* | 10/2008 | Kubo | B60J 10/24 49/489.1 |
| 2009/0115227 | A1* | 5/2009 | Radmanic | B60J 10/248 296/213 |
| 2009/0255187 | A1* | 10/2009 | Alexander | B60J 10/244 49/477.1 |
| 2010/0313486 | A1* | 12/2010 | Kuribayashi | B60J 10/82 49/490.1 |
| 2011/0219701 | A1* | 9/2011 | Fukuta | B60J 10/36 49/493.1 |
| 2012/0240473 | A1* | 9/2012 | Minoura | B29D 99/0053 264/250 |
| 2013/0113236 | A1* | 5/2013 | Oomen | B60J 10/84 296/192 |
| 2015/0068128 | A1* | 3/2015 | Baxter | B62D 25/081 49/495.1 |
| 2015/0123310 | A1* | 5/2015 | Leonard | B29C 45/1671 264/250 |
| 2016/0280153 | A1* | 9/2016 | Filipczak | B60J 10/86 |
| 2018/0087667 | A1* | 3/2018 | Thiel | B60J 10/30 |
| 2019/0152536 | A1* | 5/2019 | Takashi | B62D 25/07 |
| 2019/0255923 | A1* | 8/2019 | Salles | B61D 19/026 |
| 2019/0359043 | A1* | 11/2019 | Gollapalli | B60J 10/27 |
| 2020/0172024 | A1* | 6/2020 | Kubota | B60J 10/30 |
| 2020/0231028 | A1* | 7/2020 | Yun | B60J 10/87 |
| 2020/0317143 | A1* | 10/2020 | Goode | B62D 63/061 |
| 2021/0300164 | A1* | 9/2021 | Kumar | B60J 10/248 |
| 2021/0300165 | A1* | 9/2021 | Yamada | B60J 10/24 |
| 2022/0072937 | A1* | 3/2022 | Black | B60J 10/33 |

FOREIGN PATENT DOCUMENTS

| | | | | | |
|---|---|---|---|---|---|
| CN | 104827982 | A | | 8/2015 | |
| CN | 105522902 | A | | 4/2016 | |
| CN | 206383785 | U | | 8/2017 | |
| CN | 108883690 | A | | 11/2018 | |
| DE | 102007045656 | A1 | * | 4/2009 | B60J 10/24 |
| DE | 102009004873 | A1 | * | 7/2010 | B60J 10/0022 |
| DE | 102014111215 | B3 | * | 8/2015 | B60J 10/21 |
| EP | 014229 | A1 | | 12/1997 | |
| JP | 01-83611 | | | 6/1989 | |
| JP | 1991-43080 | | | 9/1991 | |
| JP | 5-60921 | | | 8/1993 | |
| JP | 2620327 | B2 | * | 3/1997 | B60J 10/24 |
| JP | 11-235955 | | | 8/1999 | |
| JP | 2002-541 | | | 2/2002 | |
| JP | 2005-255031 | | | 9/2005 | |
| JP | 2006-88860 | | | 4/2006 | |
| JP | 2006335168 | A | * | 12/2006 | B60J 10/24 |
| JP | 2009-23583 | | | 2/2009 | |
| JP | 2009-234441 | | | 10/2009 | |
| JP | 2011-098646 | | | 5/2011 | |
| JP | 4818030 | | | 11/2011 | |

OTHER PUBLICATIONS

Office Action for CN Patent Application No. 201911191420.1, dated Oct. 26, 2022, 6 pages.

* cited by examiner

WEATHER STRIP, WEATHER STRIP ATTACHMENT STRUCTURE, AND WEATHER STRIP ATTACHMENT METHOD

This Nonprovisional application claims priority under 35 U.S.C. § 119 on Patent Application No. 2018-223953 filed in Japan on Nov. 29, 2018, the entire contents of which are hereby incorporated by reference.

TECHNICAL FIELD

The present invention relates to a weather strip for an automobile, a structure for attaching the weather strip, and a method for attaching the weather strip.

BACKGROUND ART

A weather strip is commonly used in order to seal a gap between (i) an opening and closing member (e.g., a hood) which is included in an automobile so as to be openable and closable and (ii) an opening, to be sealed by the opening and closing member, of the automobile. The weather strip is attached to the automobile with use of clips. To enable securing the weather strip to the automobile reliably with use of a smaller number of clips, there has been developed a weather strip having a shape that assists attachment of the weather strip carried out with use of the clips (e.g., a shape that allows part of the weather strip to be latched onto a portion to which the weather strip is to be attached).

Patent Literature 1 discloses a structure for attaching a weather strip for a radiator grille. The structure involves a protruding part of the weather strip, and attachment of the weather strip to a radiator grille of an automobile is carried out with use of the protruding part together with clips.

CITATION LIST

Patent Literature

[Patent Literature 1]
Japanese Patent Application Publication Tokukai No. 2009-234441

SUMMARY OF INVENTION

Technical Problem

However, the attachment of the weather strip of Patent Literature 1 to the automobile is premised on the use of the clips. Further, Patent Literature 1 does not disclose a shape of the weather strip which shape assists the attachment of the weather strip to the automobile and thereby enables easy attachment of the weather strip to the automobile.

It is a first object of an aspect of the present invention to provide a weather strip which can be easily attached to a grille of an automobile without the need of a clip.

It is a second object of an aspect of the present invention to provide a weather strip which can be attached to a body via a grille even in a case where an attempt to attach the weather strip with use of clips causes interference, in some locations, between a clip and the body due to a small distance between the grille and the body.

Solution to Problem

In order to attain the object, a weather strip in accordance with an aspect of the present invention is a weather strip which seals a gap between a grille and a hood of an automobile, including: an attachment wall to be attached to the grille; a sealing wall which is connected to the attachment wall and comes into elastic contact with the hood; and an insertion section which is provided on a bottom surface of the attachment wall and is to be inserted into a through hole provided in the grille, the insertion section including a locking portion to be locked on a circumferential wall of the grille which circumferential wall forms the through hole.

In order to attain the object, a structure for attaching a weather strip in accordance with an aspect of the present invention is a structure for attaching a weather strip which seals a gap between a grille and a hood of an automobile, the weather strip including: an attachment wall to be attached to the grille; and a sealing wall which is connected to the attachment wall and comes into elastic contact with the hood, the structure including: an insertion section provided on a bottom surface of the attachment wall, the insertion section (i) being inserted into a through hole provided in the grille and (ii) including a locking portion to be locked on a circumferential wall of the grille which circumferential wall forms the through hole.

In order to attain the object, a method for attaching a weather strip in accordance with an aspect of the present invention is a method for attaching a weather strip which seals a gap between a grille and a hood of an automobile, the weather strip including: an attachment wall to be attached to the grille; a sealing wall which is connected to the attachment wall and comes into elastic contact with the hood; and a tilted wall provided between the attachment wall and the sealing wall, the method including the steps of: a first step of (i) inserting an insertion section, which is provided on a bottom surface of the attachment wall, into a through hole provided in the grille and (ii) pressing the tilted wall in a direction from a top side to a bottom side of the automobile via a front portion of the sealing wall so as to cause a locking portion of the insertion section to be locked on a circumferential wall of the grille which circumferential wall forms the through hole; and a second step of attaching the grill, to which the weather strip has been attached, to a body of the automobile.

Advantageous Effects of Invention

According to an aspect of the present invention, it is possible to provide a weather strip which can be easily attached to a grille of an automobile without the need of a clip.

DESCRIPTION OF EMBODIMENTS

General Description of Invention

Figure 1:
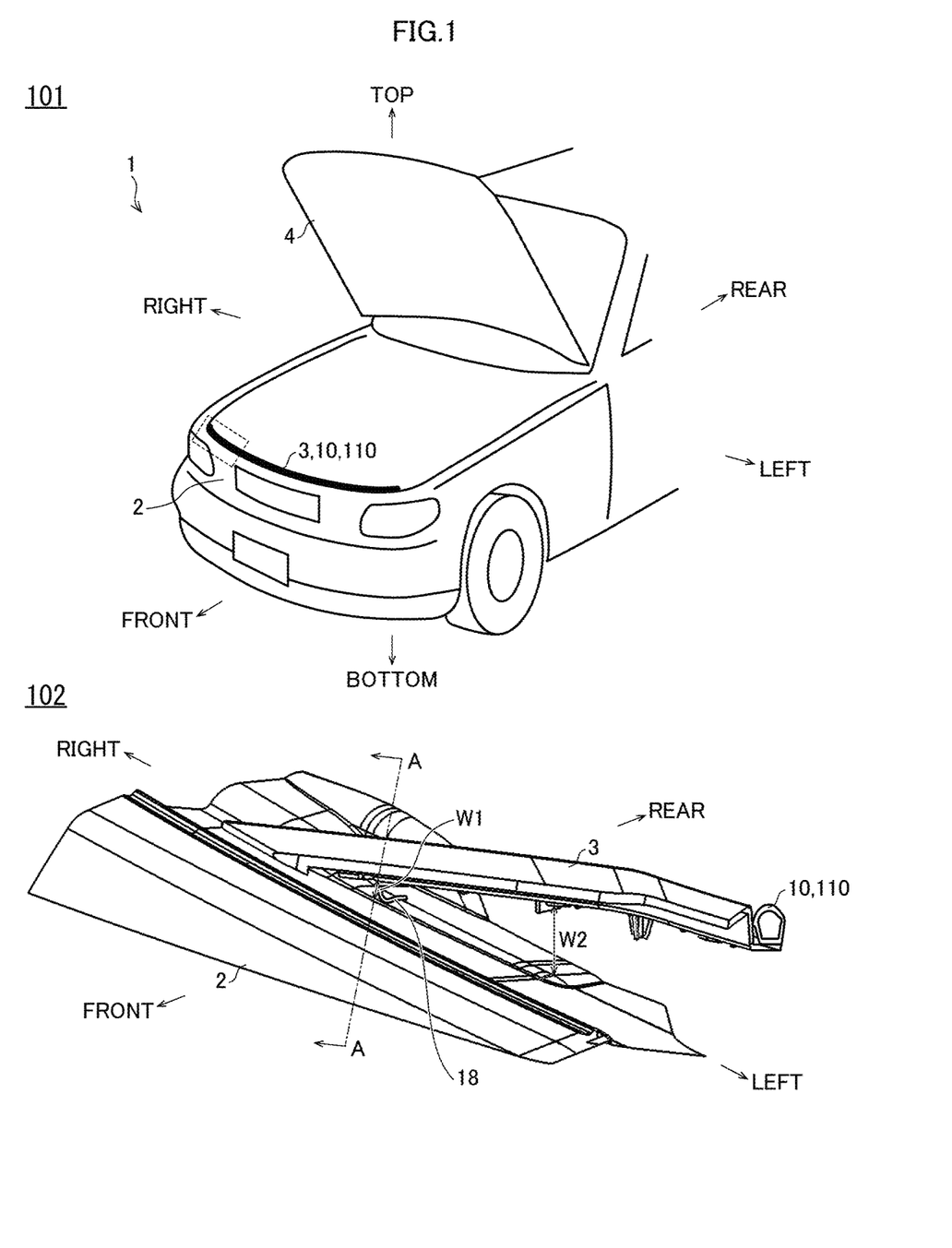
FIG. 1 shows (i) a view captioned "101" which is a sketch of an automobile, the view illustrating a position on a grille at which position a weather strip in accordance with an embodiment of the present invention is attached to the grille and (ii) a view captioned "102" which is an enlarged view of the vicinity of a right end of the grille.

The following description will discuss an embodiment of the present invention with reference to FIGS. 1 through 6. In FIG. 1, a view captioned "101" is a sketch of an automobile 1, the view illustrating a position on a grille 3 at which position a weather strip 10 in accordance with the present embodiment is attached to the grille 3. In FIG. 1, a view captioned "102" is an enlarged view of the vicinity of a right end of the grille 3. Note that the vicinity of the right end of the grille 3 means a portion in a dotted-line frame shown in the view captioned "101" of FIG. 1.

In the present specification, "top", "bottom", "down", "left", "right", "front", and "rear" of the weather strip 10 are merely illustrative of directions in a state where the weather strip 10 is attached to the grille 3 from a top side of the automobile 1, and are not intended in any way to limit a position and a direction at and in which the weather strip 10 is attached to the grille 3. The weather strip 10 may be attached to any position of the grille 3 from any direction.

As illustrated in the view captioned "101" and the view captioned "102" of FIG. 1, the weather strip 10 is a weather strip for sealing a gap between the grille 3 and a hood 4 of the automobile 1. The weather strip 10 is attached to the grille 3.

Depending on a type of the automobile 1, a gap between the grille 3 and a body 2 may be small. An example of such a case is illustrated in the view captioned "102" of FIG. 1, in which a relation W1<W2 always holds true where W2 is a gap between the grille 3 and the body 2 at a given position on a front side of the automobile 1 and W1 is a gap between the grille 3 and the body 2 at a position that is closer to a left side or a right side of the automobile 1 than the given position is.

Figure 2:
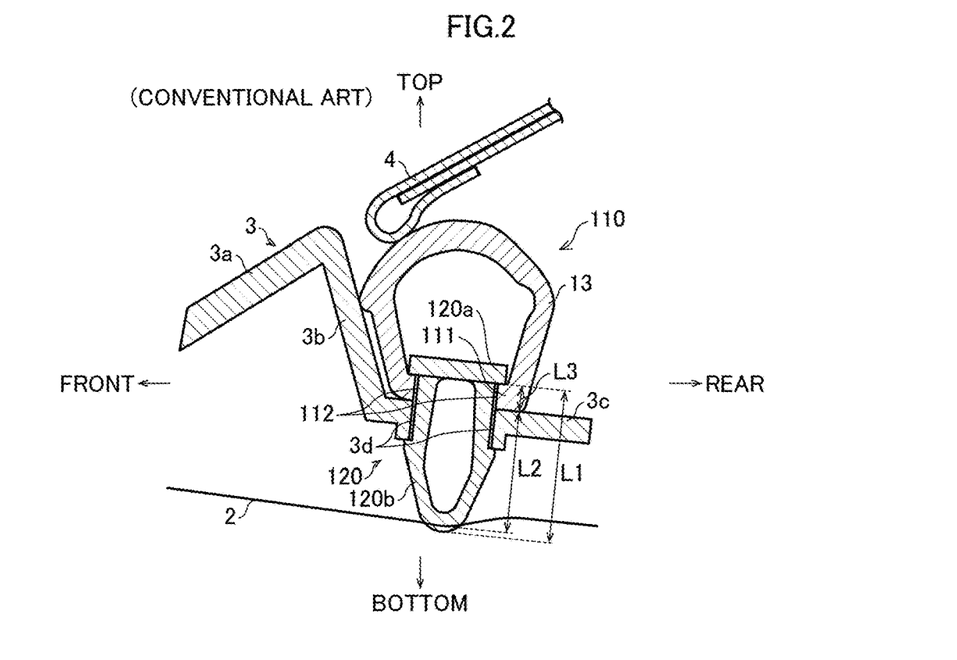
FIG. 2 is a cross-sectional view taken along a line A-A of the view captioned "102" of FIG. 1 and in a front-rear direction of the automobile, the cross-sectional view illustrating a state in which a weather strip in accordance with conventional art is attached.
Figure 3:
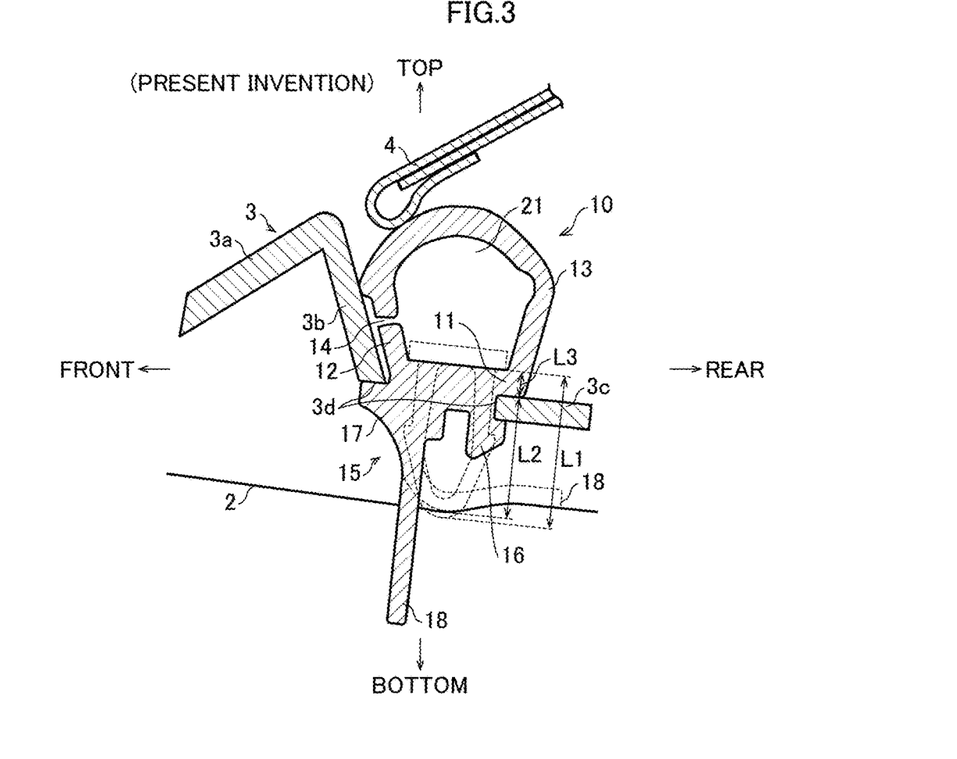
FIG. 3 is a cross-sectional view taken along the line A-A of the view captioned "102" of FIG. 1 and in the front-rear direction of the automobile, the cross-sectional view illustrating a state in which the weather strip in accordance with the embodiment of the present invention is attached.

FIGS. 2 and 3 are each a cross-sectional view taken along a line A-A of the view captioned "102" of FIG. 1 and in a front-rear direction of the automobile 1. FIG. 2 illustrates a state in which a weather strip 110 in accordance with conventional art is attached to the grille 3. FIG. 3 illustrates a state in which the weather strip 10 in accordance with the present embodiment is attached to the grille 3.

As illustrated in FIG. 2, the weather strip 110 is secured to the grille 3 by causing a clip hole 112 provided in the weather strip 110 and a through hole 3d provided in the grille 3 to be secured to each other by causing a clip 120 to pass through the clip hole 112 and the through hole 3d.

However, in a case where, in a state where the weather strip 110 is secured to the grille 3 with use of the clip 120, a distance L1 from a bottom surface of a head 120a of the clip 120 to a bottom end of a leg 120b of the clip 120 is longer than a distance L2+L3 which is a sum of (i) a length L2 from a top surface of a rear attachment panel 3c of the grille 3 to a top surface of the body 2 and (ii) a thickness L3 of an attachment wall 111 along a top-bottom direction (i.e., in a case where a relation L1>L2+L3 holds true), the body 2 interferes with the clip 120. In such a case, it is difficult to secure the weather strip 110 to the grille 3 reliably.

In contrast, as illustrated in FIG. 3, the weather strip 10 in accordance with the present embodiment includes, on a bottom surface of an attachment wall 11 to be attached to the grille 3, an insertion section 15 to be inserted into the through hole 3d. The insertion section 15 has a rear locking portion 16 and a front locking portion 17 (locking portion) which are locked on a circumferential wall of the grille 3, which circumferential wall forms the through hole 3d. Accordingly, by inserting the insertion section 15 into the through hole 3d so as to cause the insertion section 15 to be locked, it is possible to attach the weather strip 10 to the grille 3 without using the clip 120.

The insertion section 15 includes a holding section 18 which extends downward and is made of a rubber-like elastic body. As such, an operator who is to attach the weather strip 10 to the grille 3 can easily attach the weather strip 10 to the grille 3 by temporarily inserting the insertion section 15 into the through hole 3d and then pulling the holding section 18 from below. Note that details of a constituent material of the rubber-like elastic body will be described later.

Further, the holding section 18 is made of the rubber-like elastic body. Accordingly, in a case where the holding section 18 abuts against the body 2 when the grille 3, to which the weather strip 10 has been attached in advance, is attached to the body 2 after the insertion section 15 is inserted into the through hole 3d, the holding section 18 elastically deforms. The holding section 18 therefore does not hinder attachment of the grille 3, to which the weather strip 10 has been attached in advance, to the body 2.

Thus, the weather strip 10 can be attached even to portions of the grille 3 and the body 2 at which portions the above-described relation L1>L2+L3 holds true, that is, at which portions it is difficult to attach the weather strip 10 to the grille 3 and the body 2 with use of the clip 120. Further, the weather strip 10 makes it unnecessary to use the clip 120 when attaching the weather strip 10 to the grille 3. It is also unnecessary to newly provide another clip which, for example, is smaller in longitudinal dimension of the leg of the clip.

The weather strip 10 is formed at least as a molding-die-molded part. Note that the weather strip 10 may be formed from (i) an extrusion molded part, which includes no insertion section 15 and (ii) a molding-die-molded part to which the extrusion molded part is connected. In such a case, the extrusion molded part may be attached to the grille 3 with use of the clip 120. With this arrangement, (i) to a portion of the vehicle at which portion the relation L1>L2+L3 holds true, that is, at which portion it is difficult to attach the weather strip 10 with use of the clip 120, the weather strip 10 is attached with use of the insertion section 15, which is a molding-die-molded part and (ii) to the rest of the vehicle, the extrusion molded part is attached with use of the clip 120. Thus, in a case where (i) the weather strip is provided as a molding-die-molded part only at a portion of the weather strip 10 at which portion the insertion section 15 is required when the grille 3, to which the weather strip 10 has been attached in advance, is attached to the body 2 and (ii) the rest of the weather strip 10 is an extrusion molded part, it is unnecessary to newly provide another clip which, for example, is smaller in longitudinal dimension of the leg of the clip. This enables the weather strip 10 to be manufactured at low cost.

Structure of Weather Strip 10

Figure 4:
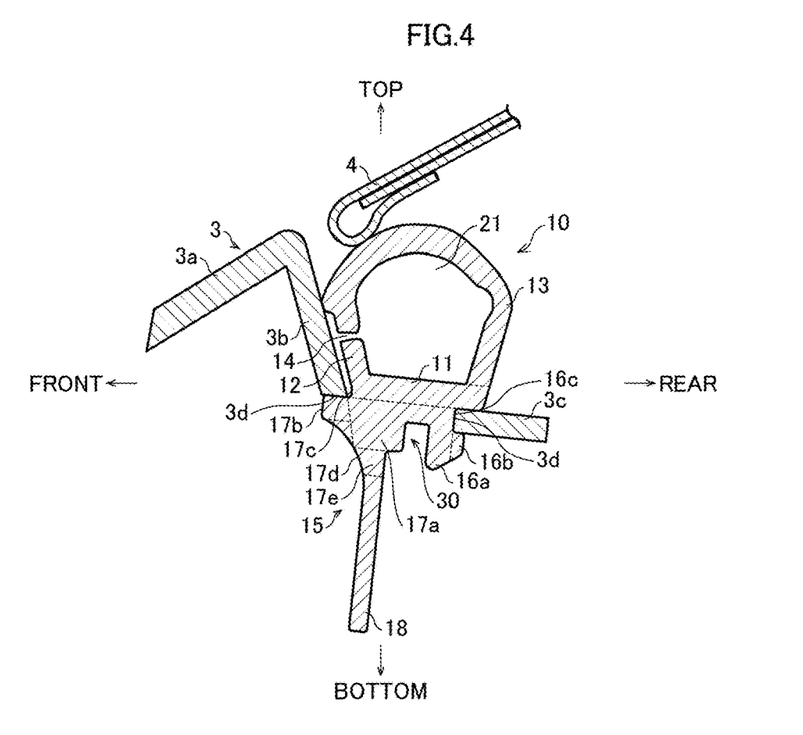
FIG. 4 is a cross-sectional view of the weather strip in accordance with the embodiment of the present invention, taken in the front-rear direction of the automobile.

FIG. 4 is a cross-sectional view of the weather strip 10 in accordance with the present embodiment, taken in the front-rear direction of the automobile 1. The weather strip 10 includes the attachment wall 11, a tilted wall 12, a sealing wall 13, and the insertion section 15.

The automobile 1 to which the weather strip 10 is to be attached includes the grille 3 and the hood 4. The grille 3 has the through hole 3d for securing the weather strip 10. The grille 3 includes (i) an outer panel 3a which is exposed to the outside even in a state where the hood 4 is closed, (ii) a tilted panel 3b which is bent from the outer panel 3a so as to extend toward a bottom side of the automobile 1, and (iii) the rear attachment panel 3c which is bent from the tilted panel 3b so as to extend toward a rear side of the automobile 1.

The through hole 3d is provided in the rear attachment panel 3c such that the through hole 3d overlaps with a boundary between the tilted panel 3b and the rear attachment panel 3c. Note that the through hole 3d is not limited to this position, and may be provided at any position of the rear attachment panel 3c. Further, a shape of the through hole 3d is preferably a rectangular shape, but may be any other shape.

The attachment wall 11 and the tilted wall 12 are portions of the weather strip 10 which portions abut against the grille 3 when the weather strip 10 is attached to the grille 3. Specifically, a portion that abuts against the tilted panel 3b is referred to as the tilted wall 12 and a portion that abuts against the rear attachment panel 3c is referred to as the attachment wall 11. The tilted wall 12 may have an inner core extraction hole 14. Though not illustrated, after a molding material is injected and press fitted into a cavity of a molding die to form the molding-die-molded part, an inner core can be extracted from the inner core extraction hole 14.

The sealing wall 13 extends from the attachment wall 11 and the tilted wall 12 so that (i) the sealing wall 13, the attachment wall 11, and the tilted wall 12 form a hollow space 21 and (ii) in a state where the hood 4 is closed, the sealing wall 13 is in elastic contact with the hood 4. This allows the weather strip 10 to seal a gap between the hood 4 and the grille 3 in a state where the hood 4 is closed.

Instead of the arrangement in which the sealing wall 13, the attachment wall 11, and the tilted wall 12 form the hollow space 21, it is possible to employ an arrangement (not illustrated) in which a lip-like sealing wall extends from an end part of the attachment wall 11 and/or an end part of the tilted wall 12 so as to seal a gap between the hood 4 and the grille 3.

Insertion Section 15

The insertion section 15 extends from the bottom surface of the attachment wall 11. The insertion section 15 includes the locking portion (16, 17) and the holding section 18. The locking portion includes the rear locking portion 16 (locking portion) and the front locking portion 17 (locking portion). That is, the locking portion is a generic term for the rear locking portion 16 and the front locking portion 17.

As illustrated in FIG. 4, the rear locking portion 16 includes (i) a rear protrusion 16a which extends downward from the bottom surface of the attachment wall 11 and (ii) a rear latching section 16b which is continuous with a lower end part of the rear protrusion 16a and protrudes toward the rear side.

Further, the rear locking portion 16 includes a rear recess 16c which (i) is formed by the lower surface of the attachment wall 11, a rear surface of the rear protrusion 16a, and a top surface of the rear latching section 16b and (ii) is recessed toward the front side.

The front locking portion 17 includes (i) a front protrusion 17a which extends downward from the bottom surface of the attachment wall 11 and (ii) a front latching section 17b which is continuous with the front protrusion 17a and protrudes toward the front side. Under the front protrusion 17a, a base 17e extends from the front protrusion 17a. Further, the front locking portion 17 includes a front recess 17c which is (i) formed by a front surface of the tilted wall 12 and a top surface of the front latching section 17b and (ii) is recessed toward the rear side so as to form an acute angle.

When the weather strip 10 is attached to the grille 3, (i) a circumferential wall of the rear attachment panel 3c which circumferential wall forms the through hole 3d is inserted into the rear recess 16c and (ii) a circumferential wall of the tilted panel 3b which circumferential wall forms the through hole 3d is inserted into the front recess 17c. In this state, the rear latching section 16b is latched onto the circumferential wall of the rear attachment panel 3c which circumferential wall forms the through hole 3d, and the front latching section 17b is latched onto the circumferential wall of the tilted panel 3b which circumferential wall forms the through hole 3d. In this manner, the weather strip 10 is locked on the circumferential wall of the grille 3 which circumferential wall forms the through hole 3d.

Note that in a case where the through hole 3d is provided in the rear attachment panel 3c such that the through hole 3d does not overlap with the boundary between the tilted panel 3b and the rear attachment panel 3c, a circumferential wall of the rear attachment panel 3c is inserted into the front recess 17c, and the front latching section 17b is latched onto the circumferential wall of the tilted panel 3b, which circumferential wall forms the through hole 3d.

Holding Section 18

The holding section 18 is a member which extends downward from a bottom surface of the front locking portion 17. When attaching the weather strip 10 to the grille 3, an operator can easily cause the front locking portion 17 to be locked on the circumferential wall, which forms the through hole 3d, of the grille 3 by temporarily inserting the insertion section 15 into the through hole 3d and then pulling the holding section 18 from below. This allows the operator to attach the weather strip 10 to the grille 3 easily.

The holding section 18 is made of a rubber-like elastic body. Examples of the rubber-like elastic body include, but not limited to, (i) a rubber such as EPDM (ethylene-propylene-diene rubber) and (ii) a thermoplastic elastomer such as an olefin thermoplastic elastomer or a styrene thermoplastic elastomer. Other rubber materials or other elastic materials such as a thermoplastic resin having rubber-like elasticity are also usable. Note that the entire weather strip 10 may be made of the same rubber-like elastic body, or the holding section 18 may be made of a rubber-like elastic body different from a rubber-like elastic body of which the other portions of the weather strip 10 are each made.

Due to being made of such a material, the holding section 18 is capable of being elastically deformed. As such, in a case where the holding section 18 abuts against the body 2 located below the through hole 3*d* when the grille 3, to which the weather strip 10 has been attached in advance, is attached to the body 2, the holding section 18 is elastically deformed. The holding section 18 therefore does not hinder attachment of the grille 3, to which the weather strip 10 has been attached in advance, to the body 2.

It is preferable that the holding section 18 have a thickness not greater than that of the sealing wall 13. This arrangement makes it easier for the holding section 18 to be elastically deformed, and accordingly makes it even less likely for the holding section 18 to hinder attachment of the weather strip 10.

The holding section 18 has a hardness of preferably not less than 30 but not more than 90, more preferably not less than 40 but not more than 80, as measured by a type A durometer in conformity with JIS K6253. With the above hardness, the holding section 18 can be elastically deformed when abutting against the body 2, to an extent that the holding section 18 does not hinder attachment of the weather strip 10. It is also possible with the above hardness to reduce a possibility that the holding section 18 is ripped off when the holding section 18 is pulled hard.

Structure for Attaching Weather Strip 10

As illustrated in FIG. 4, a structure for attaching the weather strip 10 in accordance with the present embodiment is a structure for attaching the weather strip 10 which (i) seals a gap between the grille 3 and the hood 4 of the automobile 1 and (ii) includes (a) the attachment wall 11 to be attached to the grille 3 and (b) the sealing wall 13 which is connected to the attachment wall 11 and comes in elastic contact with the hood 4, the structure including the insertion section 15 provided on the bottom surface of the attachment wall 11, the insertion section 15 (*i*) being inserted into the through hole 3*d* provided in the grille 3 and (ii) including (a) the rear locking portion 16 and the front locking portion 17 which are locked on the circumferential wall of the grille 3 which circumferential wall forms the through hole 3*d* and (b) the holding section 18 extending downward and made of the rubber-like elastic body.

Method for Attaching Weather Strip 10

Figure 5:
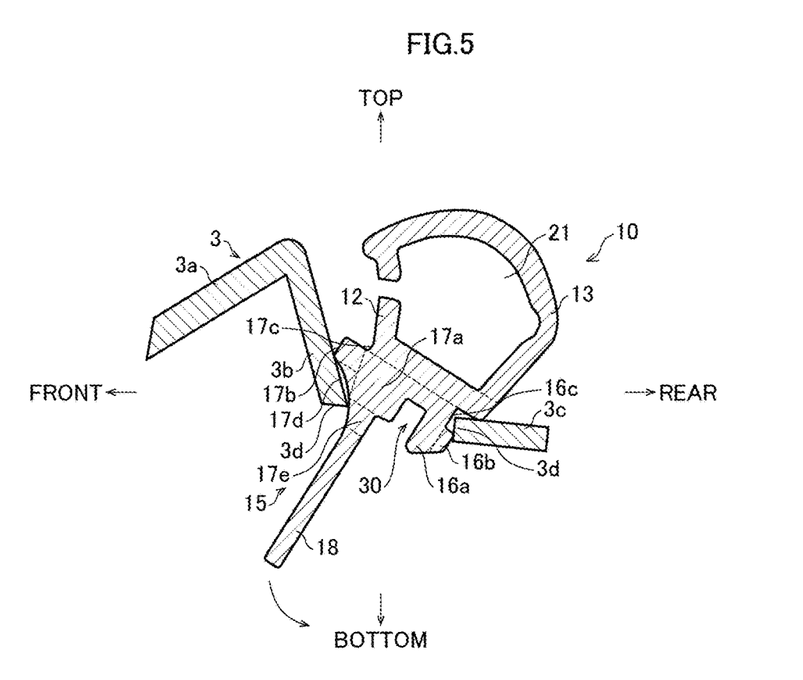
FIG. 5 is a cross-sectional view of the weather strip in accordance with the embodiment of the present invention taken in the front-rear direction of the automobile, the cross-sectional view schematically illustrating an aspect of attachment of the weather strip to the grille.

The following description will discuss, with reference to FIG. 5, a method for attaching the weather strip 10. FIG. 5 is a cross-sectional view schematically illustrating an aspect of attachment of the weather strip 10 to the grille 3.

The method for attaching the weather strip 10 includes a first step and a second step described below. In the first step, as illustrated in FIG. 5, first, the insertion section 15 is inserted into the through hole 3*d*, and the entire weather strip 10 is tilted toward the rear side so as to cause the rear locking portion 16 and a rear end part of the attachment wall 11 to be latched onto the circumferential wall of the rear attachment panel 3*c* which circumferential wall forms the through hole 3*d*. Subsequently, the holding section 18 is pulled so as to rotate obliquely downward toward the rear side, so that the front locking portion 17 is locked on the circumferential wall of the tilted panel 3*b* which circumferential wall forms the through hole 3*d*.

Note here that the insertion section 15 includes a tilted section 17*d* to which the holding section 18 and the front locking portion 17 are connected. A surface of the tilted section 17*d* which surface faces the front side forms a curved surface which is recessed toward the rear side. The tilted section 17*d* is preferably a smoothly tilted, curved surface having no irregularities.

With this arrangement, when the holding section 18 is pulled obliquely downward toward the rear side, the tilted section 17*d* can slide against the tilted panel 3*b* without getting caught by the tilted panel 3*b*. This allows the insertion section 15 to be inserted into the through hole 3*d* smoothly. Accordingly, the front locking portion 17 can be easily locked on the circumferential wall of the tilted panel 3*b* which circumferential wall forms the through hole 3*d*.

Further, the insertion section 15 includes a lightening recess 30 which is located between the rear locking portion 16 and the front locking portion 17 and is recessed toward the top side. Note that the lightening recess 30 is a recess (space) which is provided between the rear locking portion 16, which is a rear portion of the locking portion, and the front locking portion 17 by removal of part of the rubber-like elastic body of which the insertion section 15 is made.

Provision of the lightening recess 30 makes it easier for the insertion section 15 to bend and deform from the lightening recess 30 when an operator pulls the holding section 18 downward. Accordingly, the provision of the lightening recess 30 in the insertion section 15 allows the insertion section 15 to be more smoothly inserted into the through hole 3*d*.

Subsequently, as the second step of the method for attaching the weather strip 10, the grille 3 to which the weather strip 10 has been attached in advance is attached to the body 2 of the automobile 1.

With this arrangement, the order of attachment is not an order in which (i) the grille 3 is attached to the body 2 of the automobile 1 first and (ii) then the weather strip 10 is attached to the grille 3. Accordingly, it is easy to pull the holding section 18 downward from below the rear attachment panel 3*c* of the grille 3. That is, when an operator carries out an operation of attaching the weather strip 10 to the grille 3, the operator can easily secure a space for the operation. This makes it easier to attach the weather strip 10 to the body 2 via the grille 3.

Variation 1

Figure 6:
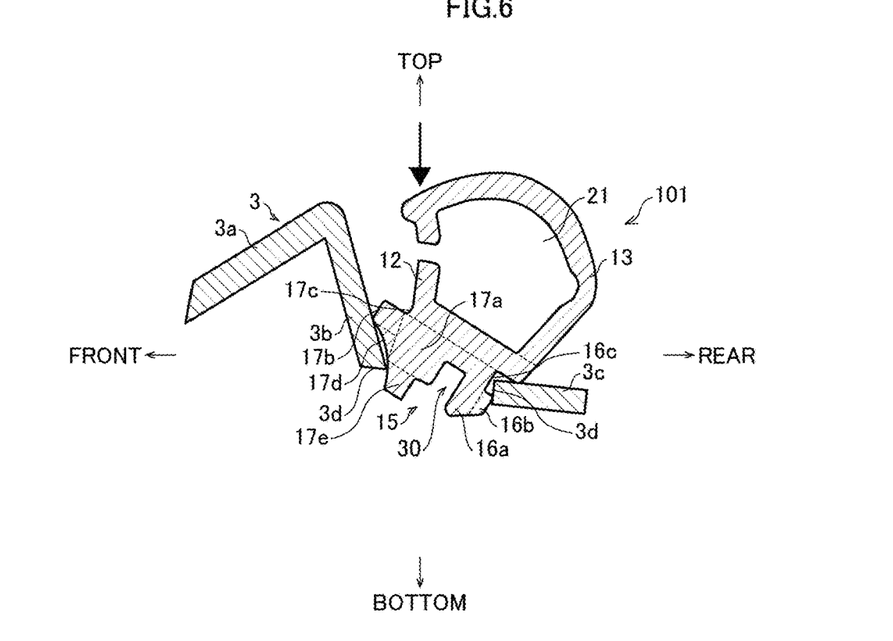
FIG. 6 is a cross-sectional view of the weather strip in accordance with a variation of the present invention taken in the front-rear direction of the automobile, the cross-sectional view schematically illustrating an aspect of attachment of the weather strip to the grille.
Figure 7:
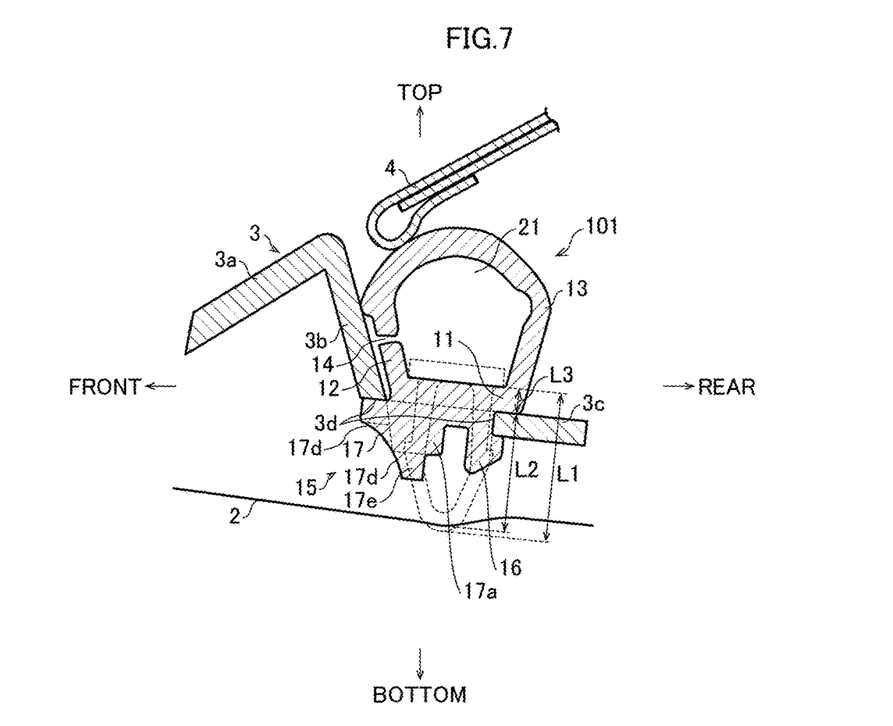
FIG. 7 is a cross-sectional view taken along the line A-A of the view captioned "102" of FIG. 1 and in the front-rear direction of the automobile, the cross-sectional view illustrating a state in which the weather strip in accordance with the variation of the present invention is attached.

The following description will discuss, with reference to FIG. 6, a method for attaching a weather strip 101 in accordance with Variation 1 of the present invention. FIG. 6 is a cross-sectional view schematically illustrating an aspect of attachment of the weather strip 101 to the grille 3. FIG. 7 is a cross-sectional view taken along the line A-A of the view captioned "102" of FIG. 1 and in the front-rear direction of the automobile, the cross-sectional view illustrating a state in which the weather strip 101 is attached. As illustrated in FIGS. 6 and 7, the weather strip 101 in accordance with Variation 1 differs from the weather strip 10 in accordance with the present embodiment in that the weather strip 101 does not include the holding section 18.

With this arrangement, the weather strip 101 is less likely to interfere with the body 2, as illustrated in FIG. 7. It accordingly becomes easier to attach the weather strip 101 to the body 2 via the grille 3.

Method for Attaching Weather Strip 101

A method for attaching the weather strip 101 includes a first step and a second step described below. In the first step, as illustrated in FIG. 6, first, an insertion section 15 is inserted into the through hole 3*d*, and the entire weather strip 101 is tilted toward the rear side so as to cause a rear locking portion 16 and a rear end part of an attachment wall 11 to be latched onto the circumferential wall of the rear attachment panel 3*c* which circumferential wall forms the through hole 3*d*.

Subsequently, a tilted wall 12 is pressed in a direction from the top side to the bottom side via a front portion of a sealing wall 13 so as to cause a front locking portion 17 to be locked on the circumferential wall of the tilted panel 3b which circumferential wall forms the through hole 3d. In addition to the pressing, it is also possible to pull the insertion section 15 from below with use of a tool or the like. Note that also in a case of attaching the weather strip 10 including the holding section 18 to the grille 3, it is possible to carry out the pressing of the tilted wall 12 as well as the pulling of the holding section 18 downward, or carry out only one of the pulling of the holding section 18 and the pressing of the tilted wall 12.

Note here that the insertion section 15 includes a tilted section 17d to which a base 17e and a front latching section 17b of the front locking portion 17 are connected. A surface of the tilted section 17d which surface faces the front side forms a curved surface which is recessed toward the rear side. The tilted section 17d is preferably a smoothly tilted, curved surface having no irregularities.

With this arrangement, when the tilted wall 12 is pressed in the direction from the top side to the bottom side via the front portion of the sealing wall 13, the tilted section 17d can slide against the tilted panel 3b without getting caught by the tilted panel 3b. This allows the insertion section 15 to be inserted into the through hole 3d smoothly. Accordingly, the front locking portion 17 can be easily locked on the circumferential wall of the tilted panel 3b which circumferential wall forms the through hole 3d. Further, the insertion section 15 includes a lightening recess 30 which is located between the rear locking portion 16 and the front locking portion 17 and is recessed toward the top side.

Note that the lightening recess 30 is a recess (space) which is provided between the rear locking portion 16, which is a rear portion of the locking portion, and the front locking portion 17 by removal of part of the rubber-like elastic body of which the insertion section 15 is made.

Provision of the lightening recess 30 makes it easier for the insertion section 15 to bend and deform from the lightening recess 30 when an operator presses the tilted wall 12 in the direction from the top side to the bottom side via the front portion of the sealing wall 13. Accordingly, the provision of the lightening recess 30 in the insertion section 15 allows the insertion section 15 to be more smoothly inserted into the through hole 3d.

Subsequently, as the second step of the method for attaching the weather strip 101, the grille 3 to which the weather strip 101 has been attached in advance is attached to the body 2 of the automobile 1.

With this arrangement, the order of attachment is not limited to an order in which (i) the weather strip 101 is attached to the grille 3 first and (ii) then the grille 3, to which the weather strip 101 has been attached, is attached to the body 2, and can instead be an order in which (i) the grille 3 is attached to the body 2 first and (ii) then the weather strip 101 is attached to the grille 3. This allows the weather strip 101 to have a high degree of freedom in terms of timing at which the weather strip 101 is attached to the grille 3.

Variation 2

Figure 8:
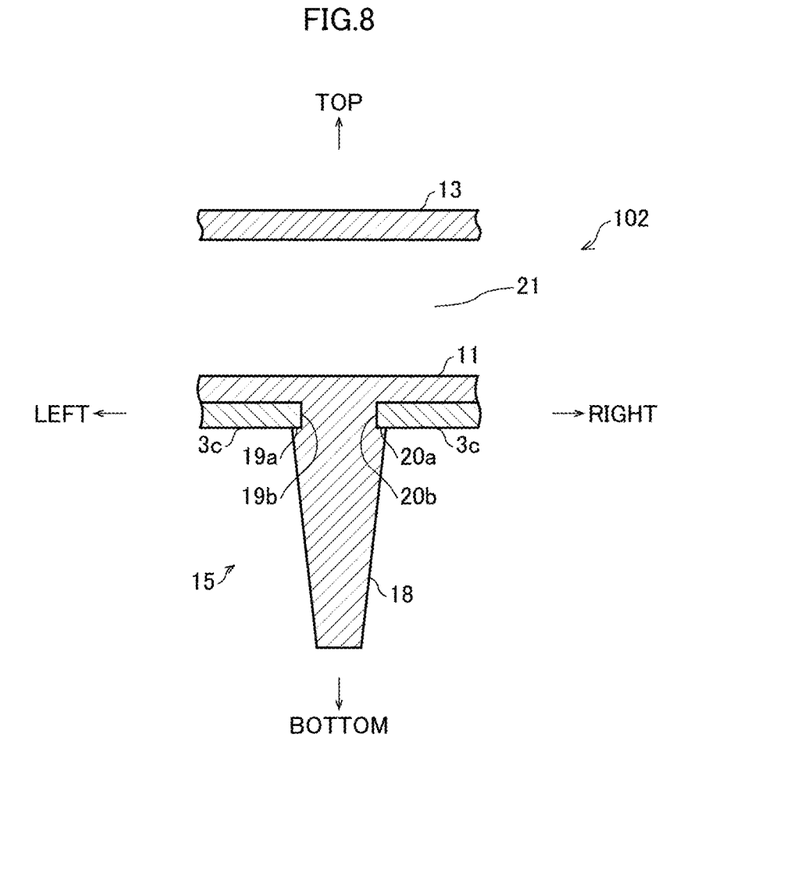
FIG. 8 is a cross-sectional view of a weather strip in accordance with another variation of the present invention, taken in a left-right direction of the automobile.

A weather strip 102 in accordance with Variation 2 of the present invention differs from the weather strip 10 in accordance with the present embodiment in that the locking portion is a locking portion (16, 17, 19, 20) which further includes a left locking portion (locking portion) 19 and a right locking portion (locking portion) 20. FIG. 8 is a cross-sectional view of the weather strip 102 in accordance with Variation 2, taken in a left-right direction of the automobile 1.

As illustrated in FIG. 8, the left locking portion 19 includes a left latching section 19a on a left side of the insertion section 15, the left latching section 19a being a base end portion of the holding section 18 which base end portion protrudes toward the left side. The left locking portion 19 also includes a left recess 19b which is recessed toward the right side between a bottom surface of an attachment wall 11 and the left latching section 19a.

The right locking portion 20 includes a right latching section 20a on a right side of the insertion section 15, the right latching section 20a being a base end portion of the holding section 18 which base end portion protrudes toward the right side. The right locking portion 20 also includes a right recess 20b which is recessed toward the left side between the bottom surface of the attachment wall 11 and the right latching section 20a.

With this arrangement, locking of the weather strip 102 on the circumferential wall of the grille 3 which circumferential wall forms the through hole 3d can be achieved not only by the rear locking portion 16 and the front locking portion 17 but also by the left locking portion 19 and the right locking portion 20. This allows the weather strip 102 to be secured reliably also with respect to the left-right direction of the automobile.

Note that it is preferable that the left locking portion 19 and the right locking portion 20 be each connected to the rear locking portion 16 and the front locking portion 17 so that the locking portion (16, 17, 19, 20) is provided in a continuous shape.

With this arrangement, the weather strip 102 can be locked on an entire circumference of the circumferential wall of the grille 3 which circumferential wall forms the through hole 3d. This allows the weather strip 102 to be reliably secured to the grille 3. Note that the left locking portion 19 and the right locking portion 20 may each be provided independently of the rear locking portion 16 and the front locking portion 17.

Aspects of the present invention can also be expressed as follows:

In order to attain the object, a weather strip in accordance with an aspect of the present invention is a weather strip which seals a gap between a grille and a hood of an automobile, including: an attachment wall to be attached to the grille; a sealing wall which is connected to the attachment wall and comes into elastic contact with the hood; and an insertion section which is provided on a bottom surface of the attachment wall and is to be inserted into a through hole provided in the grille, the insertion section including a locking portion to be locked on a circumferential wall of the grille which circumferential wall forms the through hole.

With this arrangement, no clip is necessary in order to attach the weather strip to the grille. Further, the arrangement allows the weather strip to be attached to a portion of the automobile at which portion it is difficult to attach the weather strip to the automobile with use of a clip. For example, even in a case where an attempt to attach the weather strip with use of clips causes interference, in some locations, between a clip and the body due to a small distance between the grille and the body, the weather strip can be attached to a body via the grille.

Further, by pressing the tilted wall in a direction from the top side to the bottom side via the front portion of the sealing wall when attaching the weather strip to the grille, it is possible to cause the locking portion of the insertion section, which has been inserted into the through hole, to be easily locked on the circumferential wall.

In an aspect of the present invention, the weather strip may be arranged such that the insertion section includes a lightening recess between (i) a rear locking portion, which is a rear portion of the locking portion and (ii) a front locking portion, which is a front portion of the locking portion.

With this arrangement, when the tilted wall is pressed in the direction from the top side to the bottom side via the front portion of the sealing wall in order to cause the locking portion to be locked on the circumferential wall of the grille which circumferential wall forms the through hole, a portion of the weather strip at which portion the lightening recess is provided is bent. This makes it easier for the insertion section to be inserted into the through hole. Accordingly, the locking portion can be locked on the circumferential wall smoothly.

Note that the lightening recess is a recess (space) which is provided between the rear locking portion, which is a rear portion of the locking portion, and the front locking portion by removal of part of the rubber-like elastic body of which the insertion section is made.

In an aspect of the present invention, the weather strip may be arranged such that the insertion section further includes a holding section extending downward and made of a rubber-like elastic body.

With this arrangement, by pulling the holding section, which has been inserted into the through hole, from below when attaching the weather strip to the grille, it is possible to cause the locking portion of the insertion section, which has been inserted into the through hole, to be easily locked on the circumferential wall.

In an aspect of the present invention, the weather strip may be arranged such that: the insertion section includes a tilted section to which the holding section and a front locking portion, which is a front portion of the locking portion, are connected; and a surface of the tilted section which surface faces a front side forms a curved surface which is recessed toward a rear side.

With this arrangement, when the holding section is pulled from below in order to cause the locking portion to be locked on the circumferential wall, it is possible to cause the locking portion to be locked on the circumferential wall without having the tilted section caught by the circumferential wall.

In an aspect of the present invention, the weather strip may be arranged such that the holding section has a thickness not greater than that of the sealing wall.

With this arrangement, even in a case where the holding section abuts against the body of the automobile located below the through hole of the grille, the holding section is elastically deformed. This allows the weather strip to be easily attached even to a portion of the grille at which portion the above-described member that causes interference is present.

In an aspect of the present invention, the weather strip may be arranged such that the locking portion includes (i) a left locking portion on a left side of the insertion section and (ii) a right locking portion on a right side of the insertion section.

With this arrangement, locking of the weather strip on the circumferential wall can be achieved not only by the rear locking portion and the front locking portion but also by the left locking portion and the right locking portion. This allows the weather strip to be secured reliably also with respect to the left-right direction of the automobile.

In order to attain the object, a structure for attaching a weather strip in accordance with an aspect of the present invention is a structure for attaching a weather strip which seals a gap between a grille and a hood of an automobile, the weather strip including: an attachment wall to be attached to the grille; and a sealing wall which is connected to the attachment wall and comes into elastic contact with the hood, the structure including: an insertion section provided on a bottom surface of the attachment wall, the insertion section (i) being inserted into a through hole provided in the grille and (ii) including a locking portion to be locked on a circumferential wall of the grille which circumferential wall forms the through hole.

With this arrangement, no clip is necessary in order to attach the weather strip to the grille. Further, the arrangement allows the weather strip to be attached to a portion of the automobile at which portion it is difficult to attach the weather strip to the automobile with use of a clip. Further, by pressing the tilted wall in a direction from the top side to the bottom side via the front portion of the sealing wall when attaching the weather strip to the grille, it is possible to cause the locking portion of the insertion section, which has been inserted into the through hole, to be easily locked on the circumferential wall.

In an aspect of the present invention, the structure for attaching a weather strip may be arranged such that the insertion section further includes a holding section extending downward and made of a rubber-like elastic body.

With this arrangement, by pulling the holding section, which has been inserted into the through hole, from below when attaching the weather strip to the grille, it is possible to cause the locking portion of the insertion section, which has been inserted into the through hole, to be easily locked on the circumferential wall.

In order to attain the object, a method for attaching a weather strip in accordance with an aspect of the present invention is a method for attaching a weather strip which seals a gap between a grille and a hood of an automobile, the weather strip including: an attachment wall to be attached to the grille; a sealing wall which is connected to the attachment wall and comes into elastic contact with the hood; and a tilted wall provided between the attachment wall and the sealing wall, the method including the steps of: a first step of (i) inserting an insertion section, which is provided on a bottom surface of the attachment wall, into a through hole provided in the grille and (ii) pressing the tilted wall in a direction from a top side to a bottom side of the automobile via a front portion of the sealing wall so as to cause a locking portion of the insertion section to be locked on a circumferential wall of the grille which circumferential wall forms the through hole; and a second step of attaching the grill, to which the weather strip has been attached, to a body of the automobile.

With this arrangement, no clip is necessary in order to attach the weather strip to the grille. Further, the arrangement allows the weather strip to be attached to a portion of the automobile at which portion it is difficult to attach the weather strip to the automobile with use of a clip. Further, by pressing the tilted wall in a direction from the top side to the bottom side via the front portion of the sealing wall when attaching the weather strip to the grille, it is possible to cause the locking portion of the insertion section, which has been inserted into the through hole, to be easily locked on the circumferential wall.

In an aspect of the present invention, the method for attaching a weather strip may be arranged such that the first step includes, in addition to or in place of the pressing, pulling a holding section of the insertion section downward, the holding section being made of a rubber-like elastic body and extending downward.

With this arrangement, by pulling the holding section, which has been inserted into the through hole, from below when attaching the weather strip to the grille, it is possible to cause the locking portion of the insertion section, which has been inserted into the through hole, to be easily locked on the circumferential wall.

Supplementary Note

The present invention is not limited to the embodiments, but can be altered by a skilled person in the art within the scope of the claims. The present invention also encompasses, in its technical scope, any embodiment derived by combining technical means disclosed in differing embodiments.

REFERENCE SIGNS LIST

1: Automobile
2: Body
3: Grille
3a: Outer panel
3b: Tilted plate
3c: Rear attachment plate
3d: Through hole
4: Hood
10, 101, 102, 110: Weather strip
11: Attachment wall
12: Tilted wall
13: Sealing wall
15: Insertion section
16: Rear locking portion (locking portion)
16a: Rear protrusion
16b: Rear latching section
16c: Rear recess
17: Front locking portion (locking portion)
17a: Front protrusion
17b: Front latching section
17c: Front recess
17d: Tilted section
17e: Base
18: Holding section
19: Left locking portion (locking portion)
20: Right locking portion (locking portion)
21: Hollow space
30: Lightening recess
111: Attachment wall
112: Clip hole
120: Clip

The invention claimed is:

1. A weather strip which seals a gap between a grille and a hood of an automobile, comprising:
an attachment wall to be attached to the grille;
a sealing wall which is connected to the attachment wall and comes into elastic contact with the hood; and
an insertion section which is provided on a bottom surface of the attachment wall and is to be inserted into a through hole provided in the grille,
the insertion section including a locking portion to be locked on a circumferential wall of the grille which circumferential wall forms the through hole,
the insertion section including:
a lightening recess between (i) a rear locking portion, which is a rear portion of the locking portion and (ii) a front locking portion, which is a front portion of the locking portion, the lightening recess being an opening recessed from a bottom side toward a top side; and
a tilted section to which a base and a front latching section are connected, the base constituting a lower end part of the front locking portion, the front latching section being included in the front locking portion and protruding toward the front side,
a surface of the tilted section which surface faces the front side forming a curved surface which increasingly protrudes toward the front side along a direction from the bottom side to the top side.

2. The weather strip as set forth in claim 1, wherein the insertion section includes a lightening recess between (i) a rear locking portion, which is a rear portion of the locking portion and (ii) a front locking portion, which is a front portion of the locking portion.

3. The weather strip as set forth in claim 1, wherein the insertion section further includes a holding section extending downward from the base and having a hardness of not less than 30 but not more than 90, as measured by a type A durometer in conformity with JIS K6253.

4. The weather strip as set forth in claim 3, wherein:
the insertion section includes a tilted section to which the holding section and a front locking portion, which is a front portion of the locking portion, are connected; and
a surface of the tilted section which surface faces a front side forms a curved surface which is recessed toward a rear side.

5. The weather strip as set forth in claim 3, wherein the holding section has a thickness not greater than that of the sealing wall.

6. The weather strip as set forth in claim 1, wherein the locking portion includes (i) a left locking portion on a left side of the insertion section and (ii) a right locking portion on a right side of the insertion section.

7. A method for attaching a weather strip recited in claim 1 to a grille of an automobile,
the method comprising the steps of:
a first step of (i) inserting the insertion section, which is provided on the bottom surface of the attachment wall, into a through hole provided in the grille and (ii) pressing a tilted wall, which is provided between the attachment wall and the sealing wall, in a direction from a top side to a bottom side of the automobile via a front portion of the sealing wall so as to cause a locking portion of the insertion section to be locked on the circumferential wall of the grille which circumferential wall forms the through hole; and
a second step of attaching the grill, to which the weather strip has been attached, to a body of the automobile.

8. The method as set forth in claim 7, wherein the first step includes, in addition to or in place of the pressing, pulling a holding section of the insertion section downward, the holding section being made of a rubber-like elastic body and extending downward.

* * * * *